US011250819B2

(12) United States Patent
Lamkin et al.

(10) Patent No.: US 11,250,819 B2
(45) Date of Patent: Feb. 15, 2022

(54) FOVEATED IMAGING SYSTEM

(71) Applicant: Lockheed Martin Corporation, Bethesda, MD (US)

(72) Inventors: Mark A. Lamkin, Fort Worth, TX (US); Kyle Martin Ringgenberg, Fort Worth, TX (US); Jordan David Lamkin, Fort Worth, TX (US)

(73) Assignee: Lockheed Martin Corporation, Bethesa (MD)

( * ) Notice: Subject to any disclaimer, the term of this patent is extended or adjusted under 35 U.S.C. 154(b) by 0 days.

(21) Appl. No.: 15/988,645

(22) Filed: May 24, 2018

(65) Prior Publication Data

US 2019/0362691 A1 Nov. 28, 2019

(51) Int. Cl.
*G09G 5/391* (2006.01)
*G06F 3/01* (2006.01)

(52) U.S. Cl.
CPC ............. *G09G 5/391* (2013.01); *G06F 3/013* (2013.01); *G09G 2320/0666* (2013.01); *G09G 2340/0407* (2013.01); *G09G 2350/00* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 7,542,210 B2 | 6/2009 | Chirieleison, Sr. | |
| 8,786,675 B2 | 7/2014 | Deering | |
| 2010/0149073 A1 | 6/2010 | Chaum | |
| 2014/0247277 A1 | 9/2014 | Guenter | |
| 2015/0049004 A1 | 2/2015 | Deering et al. | |
| 2016/0166146 A1 | 6/2016 | Sarkar | |
| 2016/0180591 A1 | 6/2016 | Shiu et al. | |
| 2016/0267716 A1 | 9/2016 | Patel | |

(Continued)

FOREIGN PATENT DOCUMENTS

WO    WO-2018220608 A1 * 12/2018 ......... G02B 27/0172

OTHER PUBLICATIONS

PCT Notification of Transmittal of the International Search Report and the Written Opinion of the International Searching Authority, or the Declaration re PCT/US2019/031411, dated Jul. 24, 2019.

*Primary Examiner* — Yi Wang
(74) *Attorney, Agent, or Firm* — Baker Botts L.L.P.

(57) ABSTRACT

According to certain embodiments, an image system comprises a display and a controller. A portion of the display is capable of a first visual fidelity level which is the highest visual fidelity capability of the display. The controller is configured to determine a first location of a point on the display where the center of gaze of a user intersects the display and determine a plurality of concentric regions on the display sharing a common center determined at least in part on the first location of the point. The controller is further configured to communicate a command to the display to reduce the angular and spatial resolution of selected regions below the first visual fidelity level, the reduction in visual fidelity of each region determined at least in part on a proximity of each region from the first location of the point, such that the regions farther from the point have greater levels of reduction in visual fidelity.

22 Claims, 9 Drawing Sheets

(56) References Cited

U.S. PATENT DOCUMENTS

| | | | |
|---|---|---|---|
| 2016/0379606 A1* | 12/2016 | Kollin | G02B 27/0093 |
| | | | 345/428 |
| 2017/0024893 A1 | 1/2017 | Kruglick | |
| 2017/0090562 A1 | 3/2017 | Gustafsson et al. | |
| 2017/0090563 A1 | 3/2017 | Gustafsson et al. | |
| 2017/0123488 A1 | 5/2017 | Guenter et al. | |
| 2017/0123489 A1 | 5/2017 | Guenter | |
| 2017/0155885 A1 | 6/2017 | Selstad et al. | |
| 2017/0160518 A1 | 6/2017 | Lanman et al. | |
| 2017/0160812 A1 | 6/2017 | Park et al. | |
| 2017/0192235 A1 | 7/2017 | Petrov | |
| 2017/0235362 A1 | 8/2017 | Thunström | |
| 2018/0136720 A1* | 5/2018 | Spitzer | G02B 27/0093 |
| 2019/0124277 A1* | 4/2019 | Mabuchi | B60R 1/00 |
| 2019/0156793 A1* | 5/2019 | Sun | H04N 13/139 |
| 2019/0287495 A1* | 9/2019 | Mathur | G06F 3/011 |

\* cited by examiner

FOVEATED IMAGING SYSTEM

TECHNICAL FIELD

The invention relates generally to a system for displaying foveated images around the intersection of the display and the viewer's center of gaze.

BACKGROUND

Multi-resolution images with varying regions of resolutions provides for a reduction in the complexity of an image's detail. Foveated imaging is a type of multi-resolution image where the regions of resolution correspond to the level of detail that is distinguishable by the human eye, therefore reducing the amount of superfluous detail in peripheral regions of the foveated image.

SUMMARY OF THE DISCLOSURE

According to certain embodiments, an image system comprises a display and a controller. A portion of the display is capable of a first visual fidelity level which is the highest visual fidelity capability of the display. The controller is configured to determine a first location of a point on the display where the center of gaze of a user intersects the display and determine a plurality of concentric regions on the display sharing a common center determined at least in part on the first location of the point. The controller is further configured to communicate a command to the display to reduce the angular and spatial resolution of selected regions below the first visual fidelity level, the reduction in visual fidelity of each region determined at least in part on a proximity of each region from the first location of the point, such that the regions farther from the point have greater levels of reduction in visual fidelity.

According to certain embodiments, a controller for an image system is configured to determine a first location of a point on a display that corresponds to the intersection of the center of gaze and the display and determine a plurality of concentric regions on the display with a common center determined at least in part on the first location of the point. The controller is further configured to communicate a command to the display to reduce the visual fidelity of selected regions, the reduction in visual fidelity of each region determined at least in part on the proximity of each region from the first location of the point, such that the regions farther from the point have greater levels of reduction in visual fidelity.

According to certain embodiments, a computerized method for controlling an image system comprises determining a first location of a point on a display that corresponds to an intersection of a center of gaze and the display and determining a plurality of concentric regions on the display with a common center determined at least in part on the first location of the point. The computerized method further comprises communicating a command to the display to reduce the visual fidelity of selected regions, the reduction in visual fidelity of each region determined at least in part on a proximity of each region from the first location of the point, such that the regions farther from the point have greater levels of reduction in visual fidelity.

Certain embodiments may provide one or more technical advantages. As an example, certain embodiments may provide for matching the visual fidelity of different regions of a display to the amount of detail discernible in the sight of a viewer. Matching the visual fidelity of regions of the display may enable the total amount of detail produced by the display to be reduced. Thus, the substantial demands when displaying visual information equivalent to the perception capabilities of the human eye may be lessened, reducing the graphical processing and data bandwidth required. Other advantages may include adjusting the levels of visual fidelity produced by regions of the display based the particular location on the display where the foveal region is located and updating the location whenever the location changes. Certain embodiments may include all, some, or none of the above-described advantages. Other advantages will be apparent to those of ordinary skill in the art.

BRIEF DESCRIPTION OF THE DRAWINGS

For a more complete understanding of the present disclosure, reference is now made to the following description, taken in conjunction with the accompanying drawings, in which.

DETAILED DESCRIPTION

Multi-resolution imaging is an effective means by which one may selectively reduce the complexities of an image and associated video stream. One type of multi-resolution image, a foveated image, is an image in which the image resolution or amount of detail, varies across the image according to a single fixation point. A fixation point indicates the highest resolution region of the image and corresponds to the center of the eye's retina, the foveal region. Human visual acuity is non-uniform across the field of view. The foveal region of human visual acuity draws the maximum detail only within a few degrees of the current fixation point of the user's gaze. Perception within the foveal region of the retina equates to a discernment of details at approximately one arc-minute. Spatial resolution alone requires a non-trivial number of pixels to cover the foveal region of each eye. The effect of angular resolution is especially significant for light field imagery. When accounting for the angular resolution in combination with the spatial resolution requirements of light fields, displays demand pixel quantities that far exceed existing processing and bandwidth capabilities. These demands may exceed what conventional graphics hardware may produce as well as what conventional communication channels (e.g. DisplayPort and HDMI) may support. By reducing the visual information at the periphery of a viewer's vision the required resolution may be diminished. Thus, foveation may be used to reduce the load of a graphics rendering system such as a graphics processing unit as well as the load on a communication channel such as a video interface. The disclosed approach contemplates foveating both the data stream and the angular and spatial aspects of a light field.

By using a real-time pupil tracker to determine where a user is focusing their eyes it may be possible to implement a custom gradation of rendered detail form the central fovea to the periphery. Such a system may result in an effective method for significant bandwidth reduction and signal culling. Without foveated imaging, the processing and bandwidth required for the massive number of pixels corresponding to presenting an entire light field display at the discernable resolution of the human eye far exceeds conventional hardware capabilities. By employing foveated imaging only a small portion of the display, the portion of the display corresponding to where a viewer is looking, may be imaged in full resolution and the remaining areas further from the foveal region may be imaged with progressively lower resolutions and color depths. The degree to which the visual fidelity, the resolution and color depths, is reduced will be related to the distance from the center high-resolution area.

Embodiments of the present disclosure and its advantages are best understood by referring to FIGS. 1 through 6 of the drawings, like numerals being used for like and corresponding parts of the various drawings.

Figure 1:
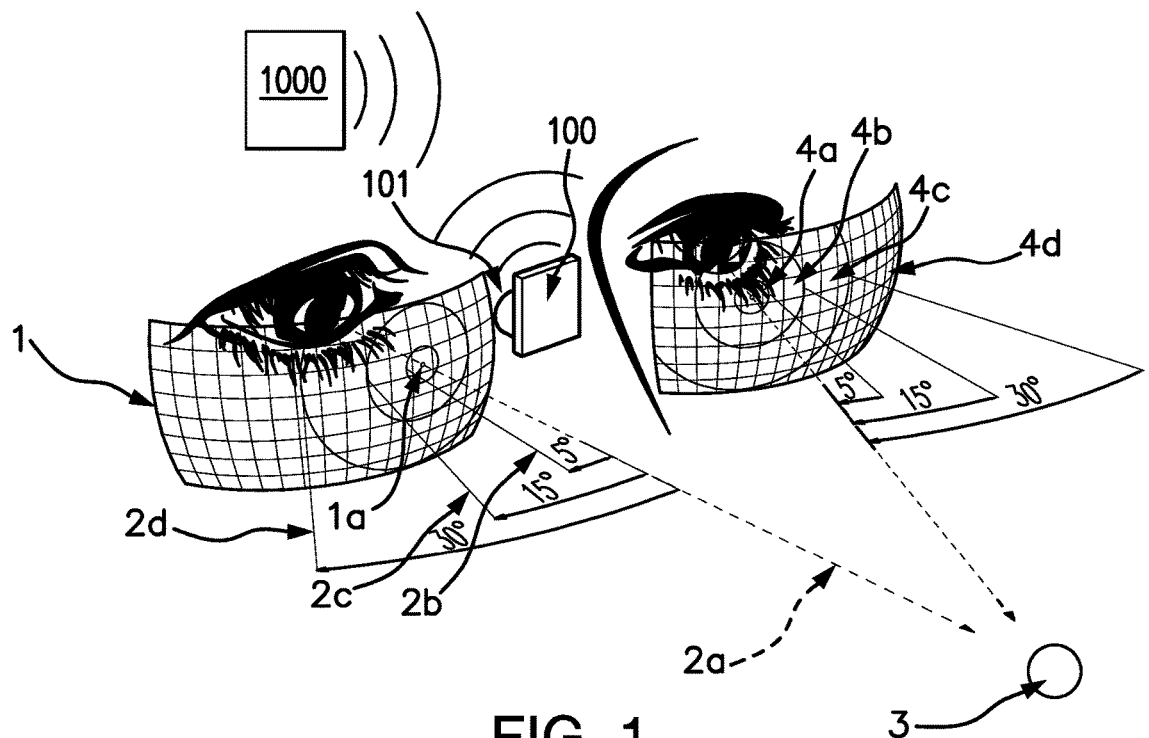
FIG. 1 illustrates an example near-eye foveated imaging system with concentric regions superimposed on the display representing the discernable detail of the regions when a user's sight is set on a nearby target object.

FIG. 1 illustrates a pair of near-eye foveated imaging displays 1 through which a user is viewing a target object 3. The foveated imaging system as illustrated may also include a sensor 100 with an eye-tracking element 101 and a controller 1000 in communication with sensor 100 and the display 1. Controller 1000 may be coupled to sensor 100 and display 1 through either a wired or a wireless interface. Controller 1000 will be described in greater detail with respect to FIG. 10. Sensor 100 may be any type of sensor capable of tracking a viewer's eye such that it may enable either sensor 100 or controller 1000 to determine the point 1a on the display 1 through which the viewer's center of gaze 2a passes.

Display 1 has a plurality of concentric regions 4a-4d defined by cones of vision 2b-2d and centered around center of gaze 2a intersecting display 1 at point 1a. Near-eye foveated imaging displays 1 may be worn by a user. Displays 1 may be transparent or opaque. As illustrated in FIG. 1, the user's eyes are focused on a nearby target object 3 that is beyond the displays 1. The user's center of gaze 2a is depicted as the axis from the user's eye to the target object 3. The center of gaze 2a intersects display 1 at point 1a on display 1. The point 1a may correspond to a first location on the display. If the user's center of gaze 2a should intersect the display 1 at a new point 1a on display 1, point 1a may define a second location on the display. The intersection of the center of gaze 2a with the display 1 may change if, for example, target object 3 moves, if the display is moved, if the user looks at some other object of interest, or for any other such reason.

Display 1 may have a circular region 4a nearest to point 1a defined by a cone of vision 2b that is 5° off-axis of the center of gaze 2a. The cone of vision 2b represents the paracentral vision where visual acuity is greatest. The paracentral vision may include the foveal and parafoveal regions of sight. Region 4a may be referred to as the foveal region of display 1.

Display 1 may have a second region 4b surrounding region 4a defined by a cone of vision 2c that is between 5°-15° off-axis of the center of gaze 2a. The cone of vision 2c represents macular vision. The region defined between 2b and 2c represents the macular region of sight.

Display 1 may have a third region 4c surrounding regions 4a-4b defined by a cone of vision 2d that is between 15°-30° off-axis of the center of gaze 2a. The cone of vision 2d represents the near-peripheral region of sight. The region defined between 2c and 2d represents the near-peripheral region of sight.

Display 1 may have a fourth region 4d surrounding regions 4a-4c. Region 4d is defined by the rest of display 1 that is greater than 30° off-axis of the center of gaze 2a and is outside of code of vision 2d. Region 4d represents the mid and far peripheral regions of sight.

By defining various regions that radiate from the point of intersection 1a of the center of gaze 2a the regions of display 1 further from the center of gaze 2a do not have to output at the full potential resolution. By confining the full resolution to only the foveal region 4a, the transmission and processing demands of an imaging system may be greatly reduced. If the imaging system updates the regions simultaneously with a change in the center of gaze 2a, redrawing the regions based on the new intersect with display 1 at a different point 1a, then the display may appear to provide complete visual fidelity to a user.

Figure 2:
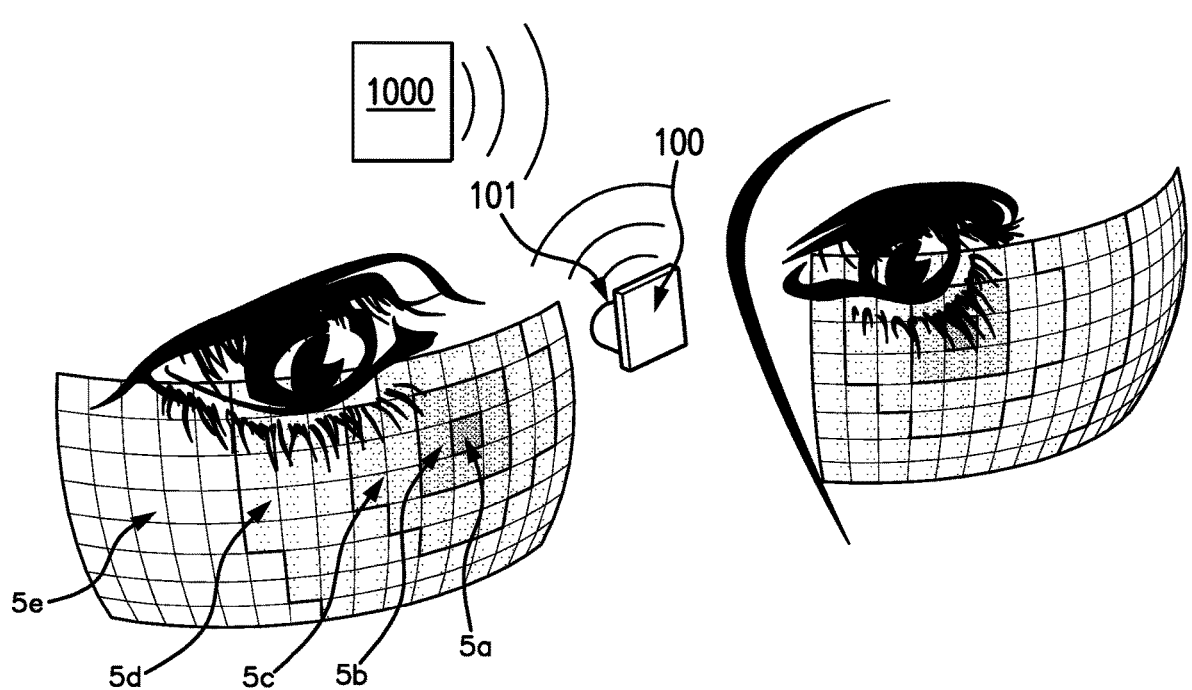
FIG. 2 illustrates an example foveated imaging system where sections of the display match the displayed level of visual fidelity to those regions illustrated in FIG. 1.
Figure 3:
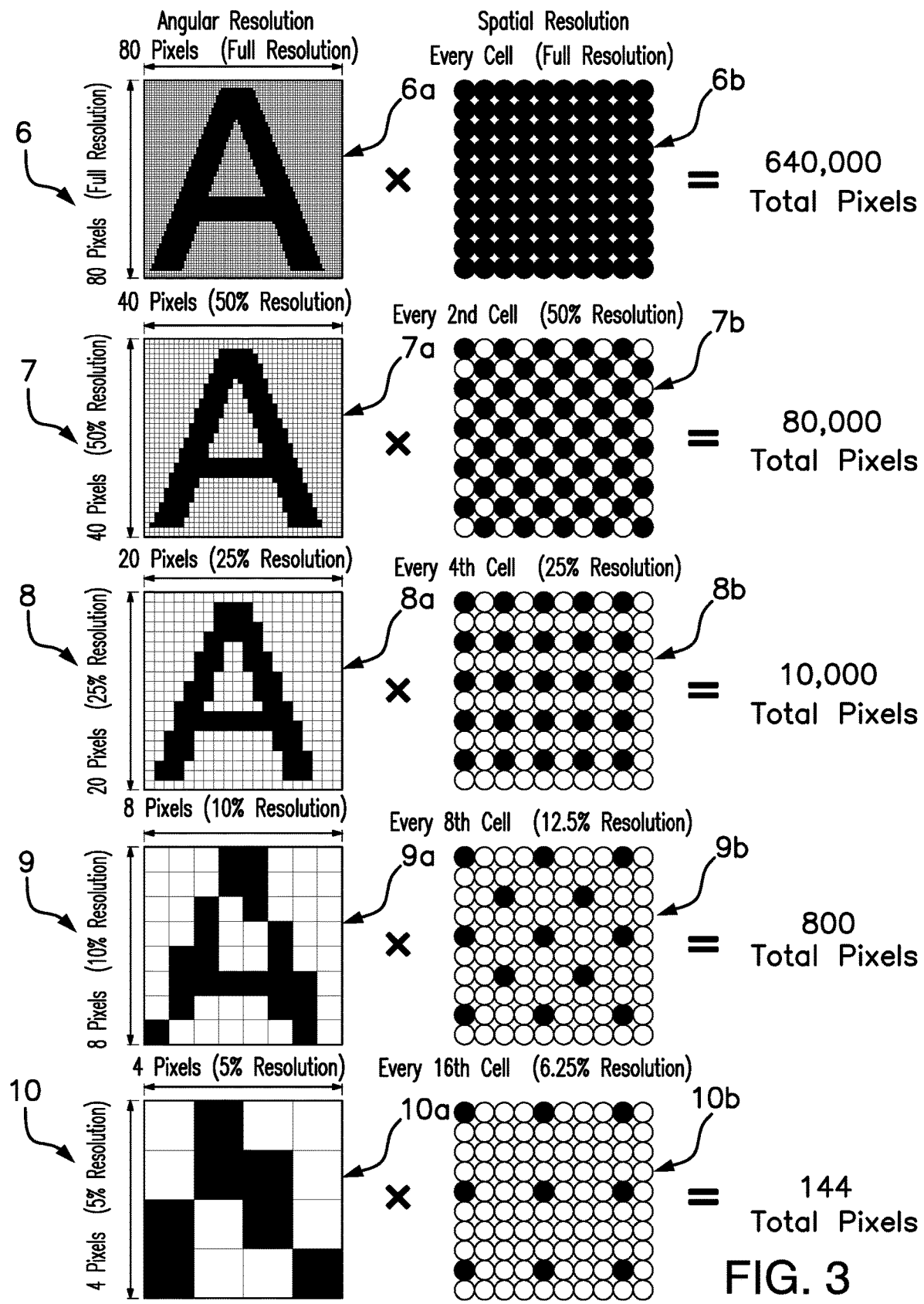
FIG. 3 illustrates various levels of reduced visual fidelity as may be performed by the regions of the display in FIG. 2.

Additional details are provided below with respect to FIGS. 2-9. FIG. 2 illustrates an example foveated imaging system where sections of a sixteen-by-eight grid display correspond with regions 4a-4d as illustrated in FIG. 1. FIG. 3 illustrates various levels of reduction in visual fidelity as may be performed by each grid section of display 1 as illustrated in FIG. 2. FIGS. 4-8 further illustrate the levels of reduction in visual fidelity presented in FIG. 3 including the angular resolution, spatial resolution, and pixel representation techniques for various levels of visual fidelity. FIG. 9 illustrates a method which may be performed by the controller for generating the concentric regions as illustrated in FIG. 2 on the display and updating such regions when a user's line of sight changes illustrates an example controller for performing the selection of the regions 4a-4d and 5a-5e as well as performing the reduction in level of visual fidelity of sections of display 1.

FIG. 2 illustrates the example image system as depicted in FIG. 1. Display 1, as illustrated in FIG. 1, includes a sixteen-by-eight grid of display sections. Display 1 may be comprised of any number of discrete sections arranged in an array. Display 1 may digitize the boundaries of regions 4a-4d to simplify the process of applying different levels of visual fidelity to different regions of the display.

A controller or computer system 1000 may be in communication with various components of the image system and may be used to facilitate the digitization of regions 4a-4d and reduce the level of visual fidelity of selected sections of display 1. The approach for reducing visual fidelity will be described further with respect to FIGS. 3-8. Controller 1000 will be described in greater detail with respect to FIG. 9.

Controller 1000 may select a single grid through which the center of gaze 2a passes and corresponding with the point of intersection 1a. This single grid may be selected as the foveal region 5a and the controller 1000 may determine to display full visual fidelity in the foveal region. The foveal region 5a may correspond to a grid providing 100% image detail for visual acuity. In certain other embodiments any number of grids may be selected as the foveal region (e.g., where display 1 is composed of a larger number of grid sections rather than a sixteen-by-eight array as depicted.).

Controller 1000 may select the grid units of the macular region 5b as the grid units immediately surrounding the foveal region grid 5a. The grid units of the macular region 5b may correspond to those grid units within region 4a other than the single grid unit selected as the foveal region. The grid units of the macular region 5b may reduce the visual fidelity to approximately 10% to 15% visual acuity to correspond to the macular region of sight.

Controller 1000 may select the grid units surrounding macular region 5b but within region 4b as the near-peripheral region 5c. The grid units of the near-peripheral region 5c may reduce the visual fidelity to approximately 1% to 2% visual acuity to correspond to the near-peripheral region of sight.

Controller 1000 may select the grid of units surrounding the near-peripheral region 5c but within region 4c as the mid peripheral region 5d. The grid units of the mid-peripheral region 5d may reduce the visual fidelity to approximately 0.1% to 0.2% visual acuity to correspond to the mid-peripheral region of sight.

Controller 1000 may select all of those grid units of region 4d which are outside of region 4c as the peripheral region 5e. The grid units of the peripheral region 5e may reduce the visual fidelity to approximately 0.02% visual acuity to correspond to the peripheral region of sight. Color information may also be withheld from peripheral region 5e. However, because peripheral vision is especially focused on movement, the framerate of peripheral region 5e may be increased with respect to the framerate of the other regions 5a-5d.

FIG. 3 may be best understood alongside the disclosure of FIGS. 4-8. Therefore, FIG. 3 will be described jointly with respect to corresponding FIGS. 4-8. FIG. 3 illustrates a set of charts illustrating the compounding methods that may be used to reduce the visual fidelity of respective regions of display 1. Five levels of visual fidelity are show as levels 6-10. For each level of visual fidelity, the angular resolution and spatial resolution are depicted. Each of the following percentages listed with respect to FIGS. 3-8 are for the purpose of example only and are not to be understood as limiting the disclosure to the particular values given for any of the example levels of resolution. It is recognized that any of the example values may be adjusted to account for a variety of factors.

As referenced herein and for the provided illustrations, spatial resolution refers to the number of sub-images within a given space that are integrated together on the viewer's retina. These images represent slightly varying views of a scene each captured from different spatial position, which combine to form a composite image structure. Angular resolution refers to the resolution of each sub-image, where each pixel represents a different ray direction within that view frustum. All the pixels in each sub-image collectively represent a range of angles spanning the angular field of view of that particular sub-image. More generally, spatial resolution refers to the number of different independent rays which point in roughly the same direction over varying position on the display whereas angular resolution refers to the number of different independent rays visible from the same position on the display over varying directions. Both the spatial resolution and angular resolution contribute to the apparent clarity of a display when viewed by an observer.

The levels of visual fidelity 6-10 range from the greatest visual fidelity 6 to the lowest visual fidelity 10. In certain embodiments there may be any number of levels of reduction in visual fidelity. The various levels of reduction in visual fidelity may also use any combination of angular or spatial resolution reduction The first stage of resolution 6 has the greatest level of visual fidelity and corresponds to FIG. 4. The first stage of resolution 6 has full 100% visual fidelity. As depicted, first stage 6 may correspond to the foveal region 5a of display 1. First stage 6 has 100% angular resolution image detail for each plenoptic cell (e.g., 80×80 pixels) and 100% spatial resolution detail (e.g., 100 cells). The distribution may be 100% angular detail in 100% of the spatial cells. The first stage of resolution 6 may have 640,000 total active pixels (i.e., the product of the 80×80 pixel grid with 100 cells).

Figure 4:
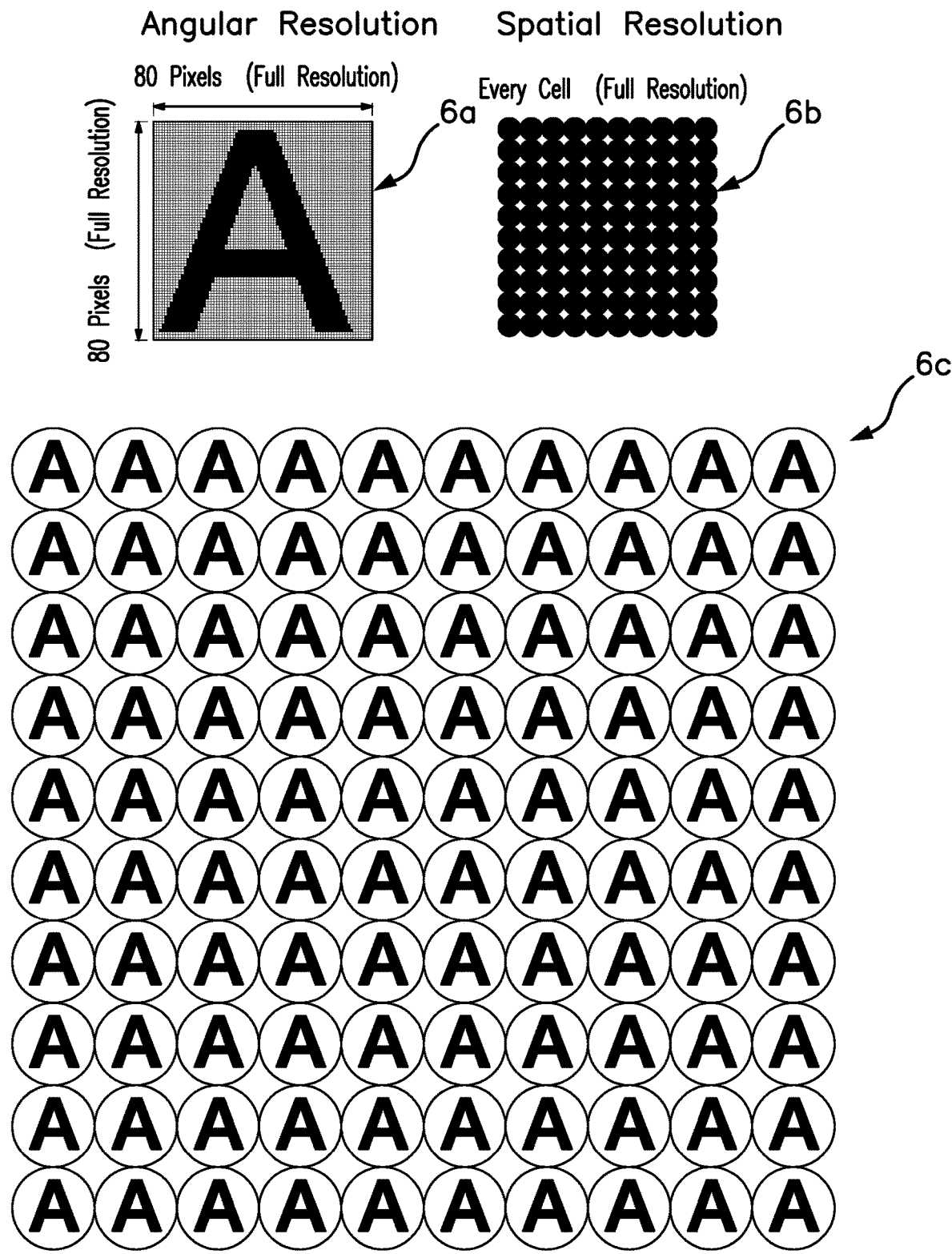
FIGS. 4-8 each illustrate the angular resolution, spatial resolution, and pixel representation techniques for particular levels of visual fidelity.

As illustrated in FIG. 4, the full spatial resolution, without any reduction in the spatial resolution, as depicted in 6c may correspond to every cell in the ten-by-ten array representing a unique spatial element (e.g., "A"). The spatial resolution presented as illustrated by array 6c would correspond to the highest level of spatial resolution of the display.

Figure 5:
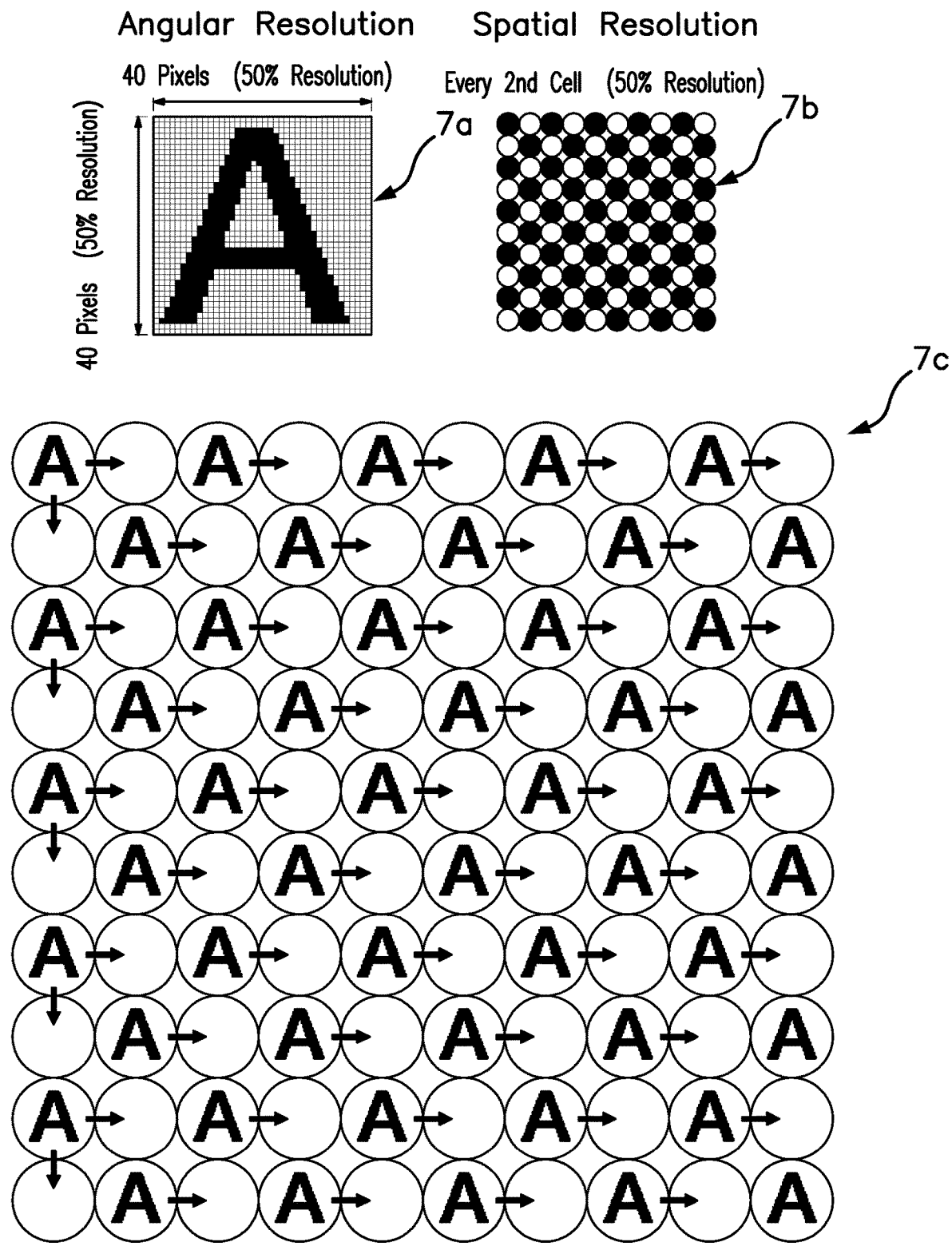

The second stage of resolution 7 has the next most level of visual fidelity and corresponds to FIG. 5. The second stage of resolution 7 may correspond to the macular region of sight 5b of display 1. The second stage of resolution 7 uses 50% angular resolution image detail for each cell (e.g., 40×40 pixels) and 50% spatial resolution detail (e.g., 50 cells). The distribution may be 50% angular detail in 50% of the spatial cells. The second stage of resolution 7 may have 80,000 total active pixels (i.e., the product of the 40×40 pixel grid with 50 cells). 80,000 total active pixels out of the 640,000 available pixels may equate to a reduced level of overall visual fidelity of 12.5% of full visual fidelity.

As illustrated in FIG. 5, the spatial resolution technique would reduce the number of unique cells by 50% such that only every other cell in the ten-by-ten array may represent a unique spatial element (e.g., "A"). As depicted, the first cell in the first position corresponds to the cell in the upper left of the array 7c. The first cell would act to represent both the unique cell itself and its neighboring cell to the right. Every other cell along the left side of array 7c would be unique and would represent its neighboring cell directly below each unique cell. For the remaining cells in array 7c, every other cell would be unique and be represented by the cell in the position immediately right of the unique cell. Although the technique of selecting the cell in the position to the right is given in the proceeding example it should be understood that any cell may be selected as a pair with the unique cell.

Figure 6:
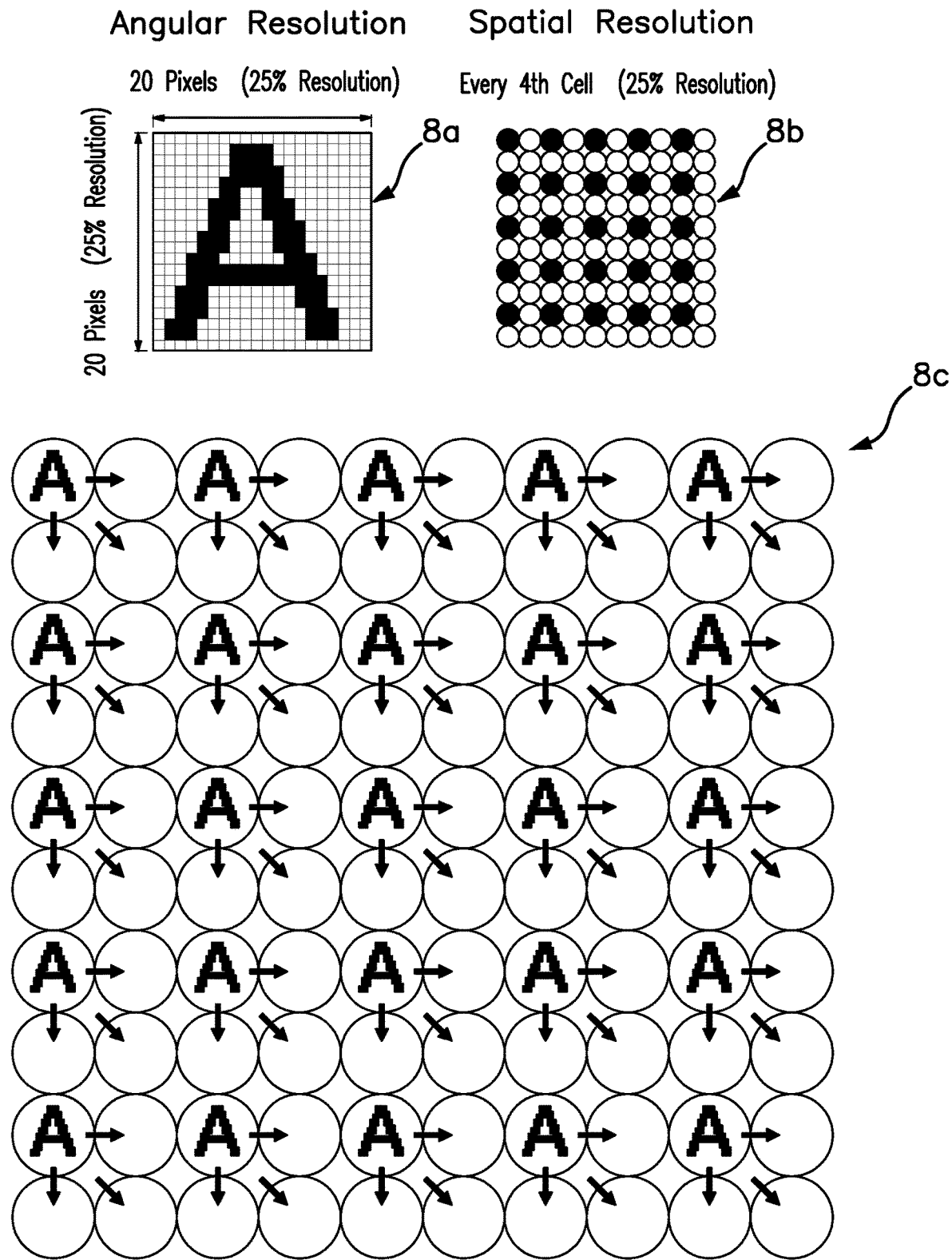

The third stage of resolution 8 has the next most level of visual fidelity and corresponds to FIG. 6. The third stage of resolution 8 may correspond to the near-peripheral region of sight 5c of display 1. The third stage of resolution 8 uses 25% angular resolution image detail for each cell (e.g., 20×20 pixels) and 25% spatial resolution detail (e.g., 25 cells). The distribution may be 25% angular detail in 25% of the spatial cells. The third stage of resolution 8 may have 10,000 total active pixels (i.e., the product of the 20×20 pixel grid with 25 cells). 10,000 total active pixels out of the 640,000 available pixels may equate to a reduced level of overall visual fidelity of ~1.563% of full visual fidelity.

As illustrated in FIG. 6, the spatial resolution technique may further reduce the spatial resolution to 25% of the highest level of visual fidelity. As illustrated by array 8c, every fourth cell would be a unique spatial element and be represented by three of its neighboring cells, the three neighboring cells would be selected from the cells in the position directly below, directly to the right, and below-and-to-the-right of the unique cell. The particular pattern described is given by way of example only and it should be understood that any arrangement of cells may be selected as a group.

Figure 7:
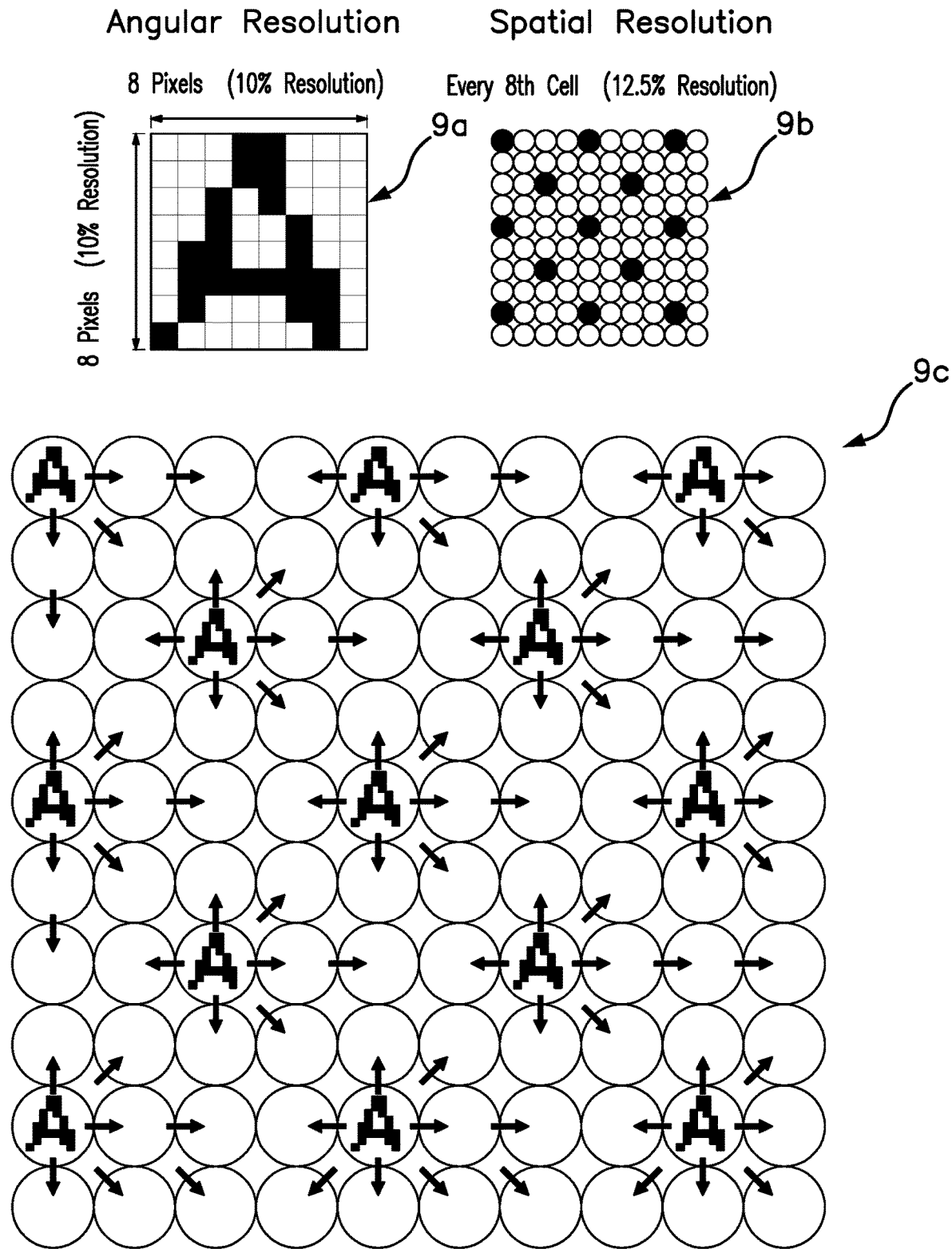

The fourth stage of resolution 9 has the next most level of visual fidelity and corresponds to FIG. 7. The fourth stage of resolution 9 may correspond to the mid-peripheral region of sight 5*d* of display 1. The fourth stage of resolution 9 uses 10% angular resolution image detail for each cell (e.g., 8×8 pixels) and 12.5% spatial resolution detail (e.g., 13 cells). The distribution may be 10% angular detail in 12.5% of the spatial cells. The fourth stage of resolution 9 may have 800 total active pixels (i.e., the product of the 8×8 pixel grid with 13 cells). 800 total active pixels out of the 640,000 available pixels may equate to a reduced level of overall visual fidelity of 0.125% of full visual fidelity.

As illustrated in FIG. 7, the spatial resolution technique may further reduce the spatial resolution to 12.5% of the highest level of visual fidelity. As illustrated by array 9*c*, every eighth cell would be a unique spatial element and be represented by those surrounding cells in a particular pattern selected from those cells directly above, below, to the left and to the right of the unique cell along with those cells also two-to-the-right, up-and-to-the-right, and down-and-to-the-right of the unique cell. The particular pattern described is given by way of example only and it should be understood that any arrangement of cells may be selected as a group.

Figure 8:
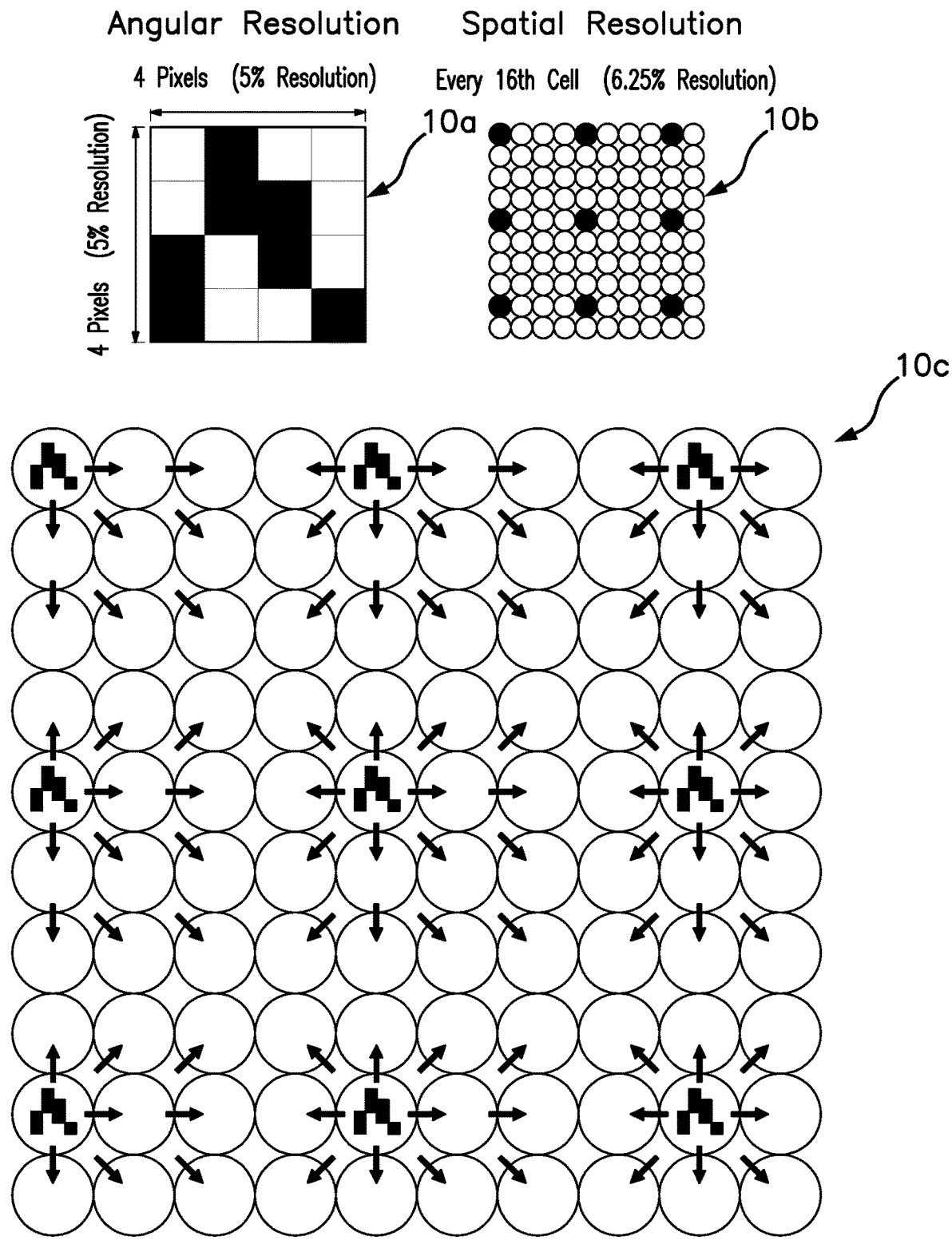
Figure 9:
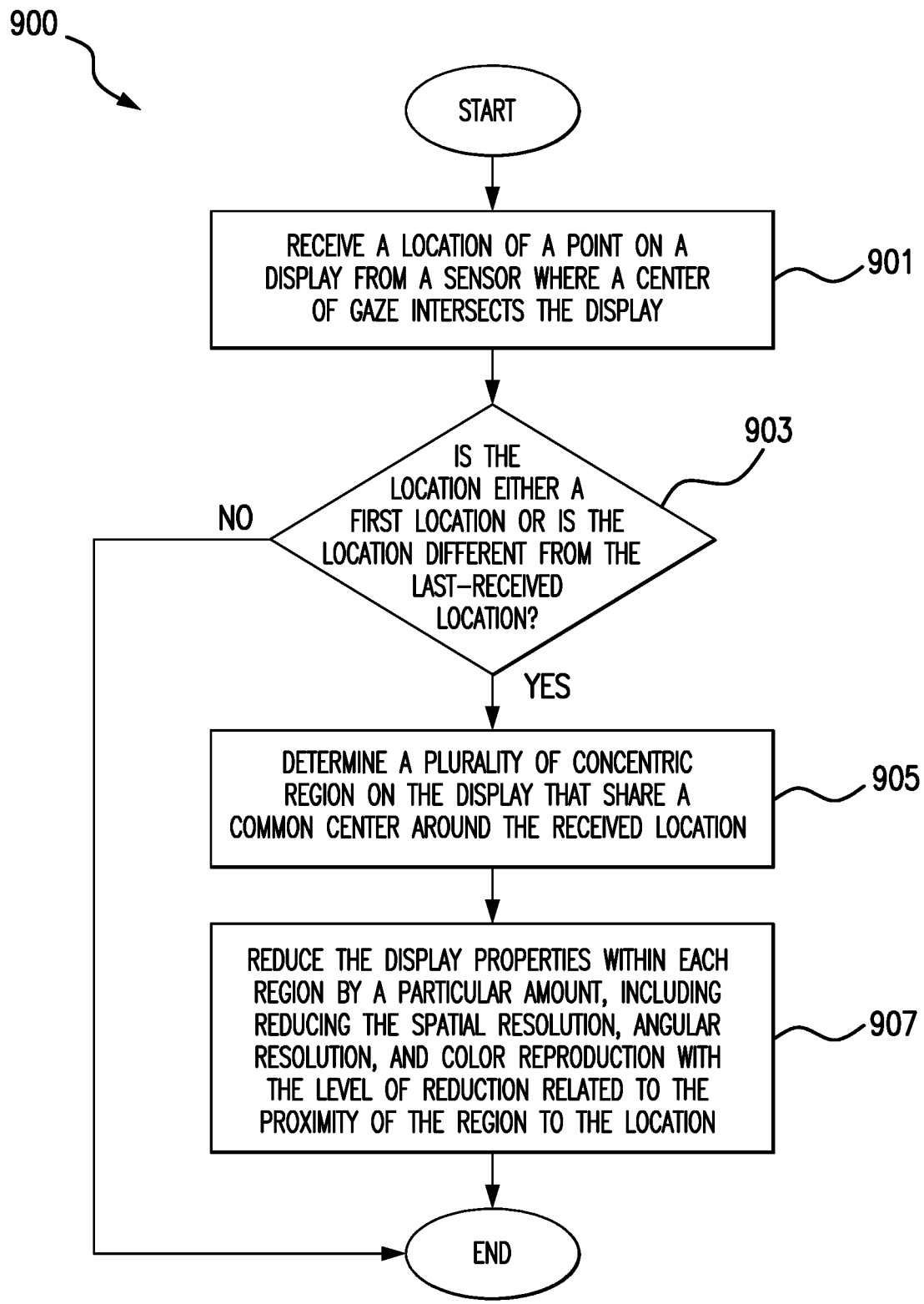
FIG. 9 illustrates a method which may be performed by a controller for generating concentric regions on the display and updating those regions when a user's line of sight changes.

The fifth stage of resolution 10 has the lowest level of visual fidelity and corresponds to FIG. 8. The fifth stage of resolution 10 may correspond to the peripheral region of sight 5*e* of display 1. The fifth stage of resolution 10 uses 5% angular resolution image detail for each cell (e.g., 4×4 pixels) and 6.25% spatial resolution detail (e.g., 9 cells). The distribution may be 5% angular detail in 6.25% of the spatial cells. The fifth stage of resolution 10 may have 144 total active pixels (i.e., the product of the 4×4 pixel grid with 9 cells). 144 total active pixels out of the 640,000 available pixels may equate to a reduced level of overall visual fidelity of ~0.0235% of full visual fidelity. As illustrated in FIG. 8, the spatial resolution technique may further reduce the spatial resolution to 6.25% of the highest level of visual fidelity. As illustrated by array 10*c*, beginning with the cell in the upper left of array 10*c* selected as unique, every sixteenth cell would be a unique spatial element and be represented by those surrounding cells in a particular pattern. The unique cell may be selected in the pattern from those eight cells directly surrounding the unique cell along with those cells also two-to-the-right, up-and-two-to-the-right, down-and-two-to-the-right, two-down-and-two-to-the-right, two-down, two-down-and-to-the-left, and two-down-and-to-the-right of the unique cell. The particular pattern described is given by way of example only and it should be understood that any arrangement of cells may be selected as a group.

FIG. 9 illustrates an example method 900 comprising a series of steps 901-907. In certain embodiments, method 900 may be performed by a computer readable medium that may be executed by example controller 1000. Controller 1000 will be described in further detail with respect to FIG. 10. In step 901 controller 1000 may receive a location of a point 1*a* where a center of gaze 2*a* intersects the display 1 from sensor 100. In other embodiments, in step 901 controller 1000 may determine a location of a point 1*a* where a center of gaze 2*a* intersects the display 1 from other data provided to controller 1000.

In step 903 controller 1000 may determine if the location from step 901 is either a first location or if the location is different from the last received location. If the location is not a new location or not a first location, then controller may terminate method 900. For example, if the location received in step 901 is the same as the location received in step 901 of a previous iteration of method 900 then the controller 1000 may persist in using the determined concentric regions from the earlier operation of method 900. Otherwise, if the location received in step 901 is a first instance of a location received by controller 1000 or is a location different than the last received location then controller 1000 may proceed with method 900 to step 905.

In step 905 controller 1000 may determine a plurality of concentric regions on the display 1 that share a common center. The common center may be the location of the point received in step 901. In step 907 controller 1000 may reduce the display properties within each of the regions determined in step 905 by a particular amount. The reduced display properties in step 907 may be a reduction in the visual fidelity of the concentric regions of display 1. The reduced visual fidelity may include reducing the spatial resolution, the angular resolution, and color reproduction. The level of reduction in visual fidelity may be related to the proximity of the particular concentric region from the location of the point from step 901.

The method described with respect to FIG. 9 may have more or fewer steps, and the steps may be performed in any suitable order (e.g., steps 905-907 may performed as a single step or certain steps may proceed others). As an example, steps 901-907 may be optional in certain embodiments or may performed in a single step in certain embodiments. Multiple iterations of method 900 may be performed to update the position of the concentric regions on display 1. For example, controller 1000 may perform method 900 in a loop to continuously center the concentric circles around the point 1*a* at which a viewer's center of gaze 2*a* intersects display 1.

Figure 10:
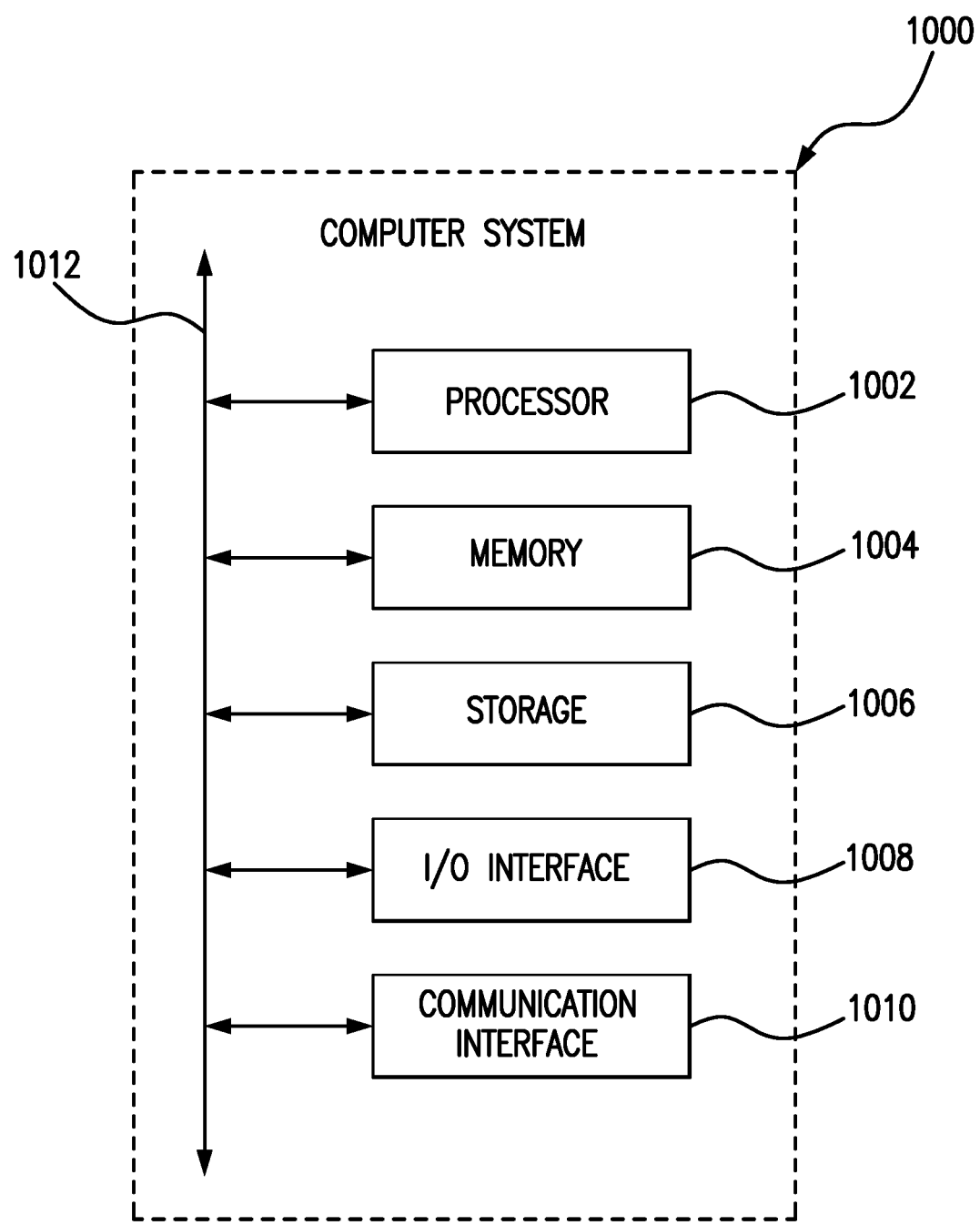
FIG. 10 illustrates a controller for performing the selection of the regions and reducing the level of visual fidelity of areas on the display.

FIG. 10 illustrates an example computer system 1000 used as a controller. Computer system 1000 may also be described as a graphics processing unit. As described above, display 1 may receive commands from a controller such as computer system 1000. One or more computer systems 1000 perform one or more steps of one or more methods described or illustrated herein. One or more computer systems 1000 provide functionality described or illustrated herein. Software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

Computer system 1000 includes a processor 1002, memory 1004, storage 1006, an input/output (I/O) interface 1008, a communication interface 1010, and a bus 1012, in particular embodiments. Although this disclosure describes and illustrates a particular computer system having a particular number of particular components in a particular arrangement, this disclosure contemplates any suitable computer system having any suitable number of any suitable components in any suitable arrangement.

Processor 1002 includes hardware for executing instructions, such as those making up a computer program, in particular embodiments. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. Processor 1002 may include one or more internal caches for data, instructions, or addresses. In particular embodiments, this disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

Memory 1004 includes main memory for storing instructions for processor 1002 to execute or data for processor 1002 to operate on. In particular embodiments, as an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

Storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. In particular embodiments, storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

I/O interface 1008 includes hardware, software, or both, providing one or more interfaces for communication between computer system 1000 and one or more I/O devices, in particular embodiments. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

Communication interface 1010 includes hardware, software, or both providing one or more interfaces for communication (such as, for example, packet-based communication) between computer system 1000 and one or more other computer systems 1000 or one or more networks, in particular embodiments. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

Bus 1012 includes hardware, software, or both coupling components of computer system 1000 to each other, in particular embodiments. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Although the angular and spatial reductions illustrated in FIGS. 3-8 are applicable to light fields, this disclosure may also be applied to standard displays using either of the angular or spatial reduction methods or combinations thereof.

Modifications, additions, or omissions may be made to any of the methods disclosed herein. These methods may include more, fewer, or other steps, and steps may be performed in parallel or in any suitable order. Certain examples have been described using the modifiers "first" or "second" (e.g., first location, second location). Unless the context in which these modifiers appear indicates otherwise, the modifiers do not require any particular sequence of steps or arrangement of devices.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

The invention claimed is:

1. An image system, comprising:
   a display intersecting a center of gaze of a user, wherein at least a portion of the display is capable of a first visual fidelity level which is the highest visual fidelity capability of the display, the visual fidelity comprising at least an angular resolution and a spatial resolution;
   a controller, the controller operable to:
     determine a first location of a point on the display corresponding to the intersection of the center of gaze and the display;
     determine a plurality of concentric regions on the display, wherein a common center of the concentric regions is determined at least in part on the first location of the point; and
     reduce the angular resolution and the spatial resolution of selected regions below the first visual fidelity level, wherein the reduction in angular resolution and spatial resolution of each region is determined at least in part on a proximity of each region from the first location of the point, the regions farther from the first location of the point having greater levels of reduction in angular resolution and spatial resolution.

2. The image system of claim 1, wherein the controller is further operable to:
   determine that the intersection of the display and the center of gaze of a user is no longer located at the first location;
   determine a second location of the point on the display corresponding to the intersection of the center of gaze and the display;
   determine a plurality of concentric regions on the display, wherein a common center of the concentric regions is determined at least in part on the second location of the point; and
   communicate a command to the display to reduce the visual fidelity of selected regions below the first visual fidelity level, wherein the reduction in visual fidelity of each region is determined at least in part on a proximity of each region from the second location of the point, the regions farther from the second location of the point having greater levels of reduction in visual fidelity.

3. The image system of claim 1, wherein the first location of the point is determined based on at least a location received by the controller.

4. The image system of claim 1, wherein the display comprises a plurality of facets.

5. The image system of claim 4, wherein a single facet defines a foveal region, the foveal region facet selected from the facet through which the center of gaze intersects, the foveal region corresponding to the facet having the greatest level of visual fidelity.

6. The image system of claim 4, wherein the facets are arranged in a grid.

7. The image system of claim 4, wherein edges of the regions are located along boundaries between the facets.

8. The image system of claim 1, wherein the display comprises a plurality of display subdivisions in an array.

9. The image system of claim 1, wherein the visual fidelity comprises color fidelity.

10. The image system of claim 1, wherein a framerate and a motion detail of each region is greater the further the region is from the first location.

11. The image system of claim 1, wherein the reduction in spatial resolution of the selected regions is via cell representation.

12. A controller for an image system configured to:
  determine a first location of a point on a display, the point corresponding to an intersection of a center of gaze and the display, the display having a visual fidelity comprising least an angular resolution and a spatial resolution;
  determine a plurality of concentric regions on the display, wherein a common center of the concentric regions is determined at least in part on the first location of the point;
  communicate a command to the display to reduce the angular resolution and the spatial resolution of selected regions, wherein the reduction in angular resolution and spatial resolution of each region is determined at least in part on a proximity of each region from the first location of the point, the regions farther from the point having greater levels of reduction in angular resolution and spatial resolution.

13. The controller of claim 12, configured to:
  determine that the intersection of the display and the center of gaze of a user is no longer located at the first location;
  determine a second location of a second point on the display corresponding to the intersection of the center of gaze and the display;
  determine that the intersection of the display and the center of gaze of a user is no longer located at the first location;
  determine a second location of the point on the display corresponding to the intersection of the center of gaze and the display;
  determine a plurality of concentric regions on the display, wherein a common center of the concentric regions is determined at least in part on the second location of the point; and
  communicate a command to the display to reduce the visual fidelity of selected regions below the first visual fidelity level, wherein the reduction in visual fidelity of each region is determined at least in part on a proximity of each region from the second location of the point, the regions farther from the second location of the point having greater levels of reduction in visual fidelity.

14. The controller of claim 12, wherein the first location of the point is determined based on at least a location received by the controller.

15. The controller of claim 12, wherein the display comprises a plurality of facets.

16. The controller of claim 15, wherein a single facet defines a foveal region, the foveal region facet selected from the facet through which the center of gaze intersects, the foveal region corresponding to the facet having the greatest level of visual fidelity.

17. The controller of claim 15, wherein edges of the regions are located along boundaries between the facets.

18. The controller of claim 12, wherein the display comprises a plurality of display subdivisions in an array.

19. The controller of claim 12, wherein the visual fidelity comprises color fidelity.

20. The controller of claim 12, wherein a framerate and a motion detail of each region is greater the further the region is from the first location.

21. A computerized method of controlling an image system comprising:
  determining a first location of a point on a display, the point corresponding to an intersection of a center of gaze and the display, the display having a visual fidelity comprising least an angular resolution and a spatial resolution;
  determining a plurality of concentric regions on the display, wherein a common center of the concentric regions is determined at least in part on the first location of the point; and
  communicating a command to the display to reduce the angular resolution and the spatial resolution of selected regions, wherein the reduction in angular resolution and spatial resolution of each region is determined at least in part on a proximity of each region from the first location of the point, the regions farther from the point having greater levels of reduction in angular resolution and spatial resolution.

22. The computerized method of claim 21, further comprising:
  determining that the second location is different from the first location;
  determine that the intersection of the display and the center of gaze of a user is no longer located at the first location;
  determine a second location of the point on the display corresponding to the intersection of the center of gaze and the display;
  determine a plurality of concentric regions on the display, wherein a common center of the concentric regions is determined at least in part on the second location of the point; and
  communicate a command to the display to reduce the visual fidelity of selected regions below the first visual fidelity level, wherein the reduction in visual fidelity of each region is determined at least in part on a proximity of each region from the second location of the point, the regions farther from the second location of the point having greater levels of reduction in visual fidelity.

* * * * *